UNITED STATES PATENT OFFICE.

CLARENCE BROOKS CLUFF, OF WESTFIELD, NEW JERSEY, ASSIGNOR TO THE AMERICAN COTTON OIL COMPANY, OF NEW YORK, N. Y., A CORPORATION OF NEW JERSEY.

PRODUCTION OF CATALYSTS.

1,381,969.     Specification of Letters Patent.     Patented June 21, 1921.

No Drawing.     Application filed November 5, 1920. Serial No. 421,864.

*To all whom it may concern:*

Be it known that I, CLARENCE B. CLUFF, a citizen of the United States, residing at Westfield, in the county of Union, State of New Jersey, have invented certain new and useful Improvements in the Production of Catalysts; and I do hereby declare the following to be a full, clear, and exact description of the invention, such as will enable others skilled in the art to which it appertains to make and use the same.

This invention relates to an improved method of producing a catalyzer which is of particular value for use in the hydrogenation of oils.

The invention is based upon the discovery that an improved catalyst of a high degree of activity can be produced by subjecting a mixture of a reducible nickel compound and melted tallow to reduction with hydrogen at a regulated temperature of about 240 to 245° C. If the temperature is increased materially beyond this point, there is danger of decomposition of the tallow which is objectionable when the resulting catalyst is to be used for the hydrogenation of edible oils. If the temperature is lower, the reduction to the catalyst is accomplished too slowly for practical operation. By mixing tallow with the nickel compound, a materially lower operating temperature can be used than when the reduction of a nickel compound is carried out in admixture with cottonseed oil. Inorganic or organic nickel compounds may be employed, e. g., the carbonate, basic carbonate, oxid, hydroxid, formate, acetate or oleate. The carbonate or basic carbonate of nickel is preferably used, these compounds being best adapted to the preparation of an inexpensive and satisfactory catalyzer.

In the practice of the invention, nickel carbonate, for example, is mixed with a suitable amount of melted tallow. The weight of the tallow is preferably 4 to 8 times that of the nickel compound. The mixture is heated to a regulated temperature of about 240 to 245° C.; and is preferably agitated while hydrogen is introduced. The reduction can be carried on at atmospheric pressure, but pressure exceeding atmospheric may also be advantageously used. At the temperatures indicated, and with the use of tallow admixed with nickel carbonate, the reduction is completed or substantially completed within an hour or two.

The tallow is hydrogenated to a considerable degree by absorption of hydrogen, while the nickel carbonate is being reduced. The mixture of reduced nickel catalyst and hardened tallow can then be added in any desired proportion to oil which is to be hydrogenated, and the hydrogenation process can be carried out as usual to produce material having the desired characteristics. In this case, the hydrogenated tallow remains in and becomes a part of the product of the hydrogenation. The tallow is bleached and purified by the hydrogenation which it undergoes during reduction of the nickel carbonate and as it readily blends with the oil, its presence in the hydrogenated product is not objectionable. The tallow may be refined before use if desired.

If it is desired to keep the hydrogenated oil partially or wholly free from tallow, the hot mixture of catalyst and hydrogenated tallow may be allowed to settle. The catalyst settles very readily and in a much shorter time than is possible where materials other than tallow are used. The catalyst is thus obtained in a condition suitable for use and with only a small proportion of tallow mixed therewith. If still more complete separation is desired, resort may be had to filtering whereby it is possible to obtain a substantially complete separation of the catalyst and tallow.

The present invention accordingly provides an improved method of making a catalyst at a relatively low temperature, below that of objectionable decomposition of tallow or oils. The resulting catalyst is one which can be readily settled or filtered out where substantially complete separation of the catalyst is desired. The tallow admixed with the catalyst does not, however, interfere with the use of the catalyst for the hydrogenation of edible oils.

Various changes may be made in the details of the operation, within the scope of the accompanying claims, without departing from the invention or sacrificing any of the advantages thereof.

I claim:

1. The method of producing a catalyst, which comprises subjecting a mixture of a reducible nickel compound and melted tallow to reduction with hydrogen at a temperature of about 240° to 245° C.

2. The method of producing a catalyst, which comprises subjecting a mixture of an inorganic reducible nickel compound and melted tallow to reduction with hydrogen at a temperature of about 240° to 245° C.

3. The method of producing a catalyst, which comprises subjecting a mixture of an oxygen containing nickel compound and melted tallow to reduction with hydrogen at a temperature of about 240° to 245°.

4. The method of producing a catalyst, which comprises subjecting a mixture of nickel carbonate and melted tallow to reduction with hydrogen at a temperature of about 240° to 245° C.

5. The method of producing a catalyst, which comprises subjecting a mixture of nickel carbonate with from about 4 to 8 times its weight of melted tallow to reduction with hydrogen at a regulated temperature of about 240° to 245° C.

6. The method of producing a catalyst, which comprises subjecting a mixture of a reducible nickel compound and melted tallow to agitation and reduction with hydrogen at a temperature of about 240° to 245° C.

7. The method of producing a catalyst, which comprises subjecting a mixture of a reducible nickel compound and melted tallow to reduction under pressure with hydrogen at a temperature of about 240° to 245° C.

In testimony whereof I affix my signature.

CLARENCE BROOKS CLUFF.